US012008750B2

(12) United States Patent
Zuo et al.

(10) Patent No.: US 12,008,750 B2
(45) Date of Patent: Jun. 11, 2024

(54) GENERATING ANNOTATION DATA OF TISSUE IMAGES

(71) Applicant: KONINKLIJKE PHILIPS N.V., Eindhoven (NL)

(72) Inventors: Fei Zuo, Eindhoven (NL); Anke Pierik, Eindhoven (NL); Reinhold Wimberger-Friedl, Waalre (DE); Koen De Laat, Udenhout (NL); Marc Van Driel, Nijmegen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 452 days.

(21) Appl. No.: 17/267,846

(22) PCT Filed: Aug. 14, 2019

(86) PCT No.: PCT/EP2019/071769
§ 371 (c)(1),
(2) Date: Feb. 11, 2021

(87) PCT Pub. No.: WO2020/035514
PCT Pub. Date: Feb. 20, 2020

(65) Prior Publication Data
US 2021/0312620 A1 Oct. 7, 2021

(30) Foreign Application Priority Data
Aug. 15, 2018 (EP) .................................. 18189097

(51) Int. Cl.
*G06T 7/00* (2017.01)
*G01N 1/30* (2006.01)
(Continued)

(52) U.S. Cl.
CPC .............. *G06T 7/0012* (2013.01); *G01N 1/30* (2013.01); *G01N 1/34* (2013.01); *G06T 7/11* (2017.01);
(Continued)

(58) Field of Classification Search
CPC ......... G06T 7/0012; G06T 7/11; G06T 11/00; G06T 2207/10056; G06T 2207/20072;
(Continued)

(56) References Cited

U.S. PATENT DOCUMENTS 8,036,462 B2 10/2011 Can
8,189,884 B2 * 5/2012 Can ..................... G06T 7/0012
600/407
(Continued)

FOREIGN PATENT DOCUMENTS

WO WO-2009072098 A1 * 6/2009 ........... G06K 9/0014
WO WO2009072098 A1 6/2009
(Continued)

OTHER PUBLICATIONS

PCT International Search Report, International application No. PCT/EP2019/071769, dated Nov. 7, 2019.
(Continued)

*Primary Examiner* — Manav Seth
(74) *Attorney, Agent, or Firm* — Sherry Austin

(57) ABSTRACT

Currently, there is interest in applying machine learning techniques to analyse digital pathology images automatically. Machine learning techniques often rely on training with a ground-truth image input. The quality and amount of training data determines the quality of the detector, as expressed in the rate of true and false positives, and robustness against variations in the appearance of the input images. The present application proposes to obtain image data of the same sample before and after at least one re-staining step (Continued)

(firstly with a structure-revealing stain, and secondly with a bio marker revealing stain). Sections of the first and second image data having a good registration relationship are chosen, along with the probability of detecting a desired candidate object (such as nucleus) and the probability of the bio marker revealing stain being present annotation data suitable for training a machine learning algorithm on the first and/or the second image data is provided.

19 Claims, 9 Drawing Sheets

(51) Int. Cl.
*G01N 1/34* (2006.01)
*G06T 7/11* (2017.01)
*G06T 11/00* (2006.01)

(52) U.S. Cl.
CPC .... *G06T 11/00* (2013.01); *G06T 2207/10056* (2013.01); *G06T 2207/20072* (2013.01); *G06T 2207/20081* (2013.01); *G06T 2207/30024* (2013.01); *G06T 2207/30168* (2013.01)

(58) Field of Classification Search
CPC . G06T 2207/20081; G06T 2207/30024; G06T 2207/30168; G01N 1/30; G01N 1/34
See application file for complete search history.

(56) References Cited

U.S. PATENT DOCUMENTS

| | | | |
|---|---|---|---|
| 9,567,651 B2* | 2/2017 | Seth | G06V 20/695 |
| 9,891,804 B2* | 2/2018 | Henderson | G16B 45/00 |
| 10,302,643 B2* | 5/2019 | Mohan | G01N 33/5308 |
| 10,541,052 B2* | 1/2020 | Varadan | G16B 20/10 |
| 11,048,911 B2* | 6/2021 | Varekamp | G06V 20/69 |
| 11,513,038 B2* | 11/2022 | Wimberger-Friedl | G01N 1/08 |
| 2011/0091081 A1* | 4/2011 | Sarachan | G01N 33/5082 |
| | | | 435/6.12 |
| 2017/0091937 A1 | 3/2017 | Barnes | |
| 2017/0103521 A1 | 4/2017 | Chukka | |
| 2017/0169567 A1 | 6/2017 | Chefd-Hotel | |
| 2019/0339271 A1* | 11/2019 | Mohan | G02B 21/00 |
| 2020/0388033 A1* | 12/2020 | Matlock | G06V 20/698 |
| 2021/0027462 A1* | 1/2021 | Bredno | G06V 20/695 |

FOREIGN PATENT DOCUMENTS

| | | | | |
|---|---|---|---|---|
| WO | WO-2016087592 A1 * | 6/2016 | ....... | G01N 33/57415 |
| WO | WO2016087592 A1 | 6/2016 | | |

OTHER PUBLICATIONS

Can A. et al., "Techniques for Cellular Quantitation of Cancer Biomarkers" In: Analytical Chemistry, Jun. 1, 2018 (Jun. 1, 2018), American Chemical Society, US, vol. 89, pp. 1-29, XP055540751.
Ing N. et al., A Novel Machine Learning Approach Reveals Latent Vascular Phenotypes Predictive of Renal Cancer Outcome, Nature, Scientific Reports, vol. 7, Article No. 13190, 2017.

* cited by examiner

GENERATING ANNOTATION DATA OF TISSUE IMAGES

CROSS-REFERENCE TO RELATED APPLICATIONS

This patent application claims the priority benefit under 35 U.S.C. § 371 of International Patent Application no. PCT/EP2019/071769, filed Aug. 14, 2019, which claims the benefit of European Patent Application No. EP18189097.1, filed on Aug. 15, 2018. These applications are hereby incorporated by reference herein in their entirety.

FIELD OF THE INVENTION

The present invention relates to an apparatus for automatically generating annotation data of tissue images, and a related computer-implemented medical image annotation method, a method for generating annotation data of tissue images, a method for training a machine learning model, and a computer program element, computer readable medium, and computer data structure.

BACKGROUND OF THE INVENTION

Currently, there is interest in applying machine learning techniques to analyse digital pathology images automatically. Machine learning techniques often rely on training with a ground-truth image input. The quality and amount of training data determines the quality of the detector, as expressed in the rate of true and false positives, and robustness against variations in the appearance of the input images.

Ground truth training images (or image tiles) are usually provided from manually annotated images, annotated by a pathologist. Although this may be feasible for larger areas of pathology image (such as tissue types), annotating large numbers of cellular objects is time-consuming, as typically thousands of objects need to be annotated.

US 2017/0103521 A1 discusses a method for identifying biomarker-positive tumour cells.

A. Can et al: "Techniques for Cellular Analysis for Lifescience Applications", in "Analytical Chemistry", 1 Jun. 2018, american Chemical Society, vol. 89, pages 1-29, provides an overview of technologies and in summary states that quantitation of multiple tissue-based biomarkers require several sequential steps including tissue staining with target specific antibodies labelled with fluorescent reagents, image capture, preprocessing, registration, segmentation and subcellular quantitation. It is described that this provides the flexibility to quantify biomarkers in more than one cellular compartment, thus maximising the amount of data present in a tissue image, and enabling more extensive analysis of the role of biomarkers in predicting response to therapy and patient survival.

However, such methods can be further improved.

SUMMARY OF THE INVENTION

It would be advantageous to have an improved approach for the automatic annotation of tissue images.

According to a first aspect, there is provided an apparatus for automatically generating annotation data of tissue images as defined in appended claim 1.

According to a second aspect, there is provided a computer-implemented medical image annotation method for automatically generating annotation data of tissue images as defined in appended claim 9.

According to a first embodiment, there is provided an apparatus for automatically generating annotation data of tissue images comprising an input unit and a processor.

The input unit is configured to acquire first image data comprising a representation of a tissue sample stained with a first stain for indicating tissue structure, and to acquire second image data comprising a representation of the tissue sample stained with a second stain for revealing the presence of a biomarker in the tissue sample.

The processor is configured to detect a plurality of candidate objects in the first image data, and a corresponding plurality of detection probabilities of the detected candidate objects, to generate stain confidence data of the second image data representing a likelihood that a corresponding portion of the tissue sample comprises the biomarker targeted by the second stain, and to generate image annotation data comprising a representation of the plurality of candidate objects, wherein the individual candidate objects of the plurality of candidate objects are annotated to indicate biomarker presence in corresponding portions of the second image data if an individual candidate object reaches a combined confidence based on the corresponding plurality of detection probabilities of the detected candidate objects, the corresponding stain confidence data, and a corresponding registration quality threshold between the first and second image data of the candidate objects.

An effect is that a reliable training dataset that can be used as an input to a machine-learning algorithm can be provided much more easily. With the application of such a data processing method to the first and second stained images, a single re-staining step of a tissue sample is necessary for providing ground-truth data for the training of a machine-learning algorithm (although more re-staining steps can be provided). Furthermore, because the generation of the image annotation data is based on the corresponding registration quality threshold between the first and second image data of the candidate objects, image annotation data is not generated for tiles having poor registration. Accordingly, the training dataset can be generated with a much higher computational efficiency (meaning, for example, that it can be implemented with a much lower computational latency or with much less advanced computing hardware).

Optionally, the processor is further configured to generate a registration quality map between the first image data and the second image data, wherein the processor is configured to annotate candidate objects of the plurality of candidate objects to indicate biomarker presence when the registration quality map indicates that the registration between corresponding locations of the candidate object in the first and second image data surpasses a registration quality threshold.

An effect is that a computationally expensive operation of generating an annotation of candidate object does not take place if the location of the candidate object is poorly registered between the first and second images, thus increasing computational efficiency.

Optionally, the processor is further configured to generate the image annotation data of the individual candidate objects of the plurality of candidate objects comprising a positive annotation of a first candidate object and a negative annotation of a second candidate object in the plurality of candidate objects.

An effect is that the generated image annotation data is ground-truth data that can be provided as suitable for providing reliable inputs into a machine-learning-based detector.

Optionally, the processor is further configured to generate the stain confidence data by generating a histogram of stain confidence using the second image data, and providing a plurality of stain confidence results corresponding to locations of the plurality of candidate objects in the first image data as the corresponding stain confidence data.

An effect is that decisions between positive and negative candidate objects in the second image data have a high degree of accuracy because they incorporate staining information from more objects.

Optionally, the processor is configured to generating the stain confidence data by generating a first channel of the second image data to function as a positive control, generating a second channel of the second image data to function as a negative control. The processor is further configured to generate a histogram of stain confidence comprising generating a first histogram channel using the first channel of the second image data, to generate a second histogram channel using the second channel of the second image data, and to generate the histogram of stain confidence using the first and second histogram channels.

An effect is that the histograms of the pixel colours (DAB channel values) of the second image data may be plotted to provide a transformation curve to match the stain values to a stain-confidence value, improving the accuracy of the generated image annotation data.

Optionally, the processor is configured to detect a plurality of candidate objects in the first image data using a nucleus detector, and the corresponding plurality of detection probabilities of the detected candidate objects.

An effect is that the annotations of candidate objects in the generated image annotation data may be weighted based upon their likelihood as identifying a cell nucleus. This means that the location of a cell nucleus revealed in the first image data may be correlated in space with a corresponding marker stain in the second image data. In the generated annotation data, less emphasis may be placed on a marker stain in the second image data having a poor cell nucleus identification likelihood, for example, thus improving the reliability of the generated image annotation data.

Optionally, the processor is configured to segment the plurality of candidate objects in the first image data, to transfer the segmentation of the plurality of candidate objects in the first image data to the second image data based on a registration between the first and second image data, and to sum the corresponding stain confidence data in the location of the plurality of candidate objects in the second image data.

Optionally, the apparatus further comprises an output unit.

The output unit is configured to display the image annotation data on a graphical user interface, optionally in combination with the first and/or second image data.

An effect is that a user of the apparatus may easily monitor the generation of image annotation data and comparing with the original first and second image data, to provide an independent verification of the reliability of the generated training data.

According to a second embodiment, there is provided a computer-implemented medical image annotation method for automatically generating annotation data of tissue images comprising:
 a) acquiring first image data comprising a representation of a tissue sample stained with a first stain for indicating tissue structure;
 b) acquiring second image data comprising a representation of the tissue sample stained with a second stain for revealing the presence of a biomarker in the tissue sample;
 c) detecting a plurality of candidate objects in the first image data, and a corresponding plurality of detection probabilities of the detected candidate objects;
 d) generating stain confidence data of the second image data representing a likelihood that a corresponding portion of the tissue sample comprises the biomarker targeted by the second stain; and
 e) generating image annotation data comprising a representation of the plurality of candidate objects, wherein the individual candidate objects of the plurality of candidate objects are annotated to indicate biomarker presence in corresponding portions of the second image data if an individual candidate object reaches a combined confidence based on the corresponding plurality of detection probabilities of the detected candidate objects, the corresponding stain confidence data, and a corresponding registration quality threshold between the first and second image data of the candidate objects.

Optionally, the first stain is a Haematoxylin and Eosin (H&E) stain, and the second stain is a immunohistochemistry (IHC) stain.

According to a third aspect, there is provided a method for generating annotation data of tissue images comprising:
 a1) acquiring a tissue sample of a patient;
 a2) performing a first staining protocol on the tissue sample using a first stain;
 a3) acquiring first image data of the tissue sample using a digital microscopy imager;
 a4) performing a washing protocol of the tissue sample to substantially remove the first stain;
 a5) performing a second staining protocol on the tissue sample using a second stain; and
 a6) acquiring second image data of the tissue sample using the digital microscopy imager; and
 performing the computer-implemented medical image annotation method for automatically generating annotation data of tissue images according to the second aspect.

An effect is that a large quantity of image annotation data may be generated automatically by performing as few as one sample restaining steps (although the technique could be applied to third, fourth, and more input image data, of restained samples).

According to a fourth aspect, there is provided a method for training a machine learning model comprising:
 f1) acquiring image annotation data generated according to the second aspect;
 f2) training a machine learning model using the image annotation data; and
 f3) outputting the trained machine learning model.

An effect is that machine learning model trained with the generated image annotation data has a higher accuracy because it is possible to produce generated image annotation data with a much greater range of sample input data.

According to a fifth aspect, there is provided a computer program element, which, when being executed by a processor, is adapted to perform the method of the first aspect or fourth aspects.

According to a sixth aspect, there is provided a computer readable medium having stored the computer program element the fifth aspect.

According to a seventh aspect computer data structure comprising image annotation data generated in accordance with the method according to claims first or fourth aspects.

In the following application, the term "annotation data" refers to metadata describing the property of input image data. For example, the annotation data may comprise a list of point coordinates in first and/or second input image data, with each entry in the list labelled with a logical "1" or logical "0", defining that a pixel at the given point coordinates satisfies a detection criterion, or not. For example, the annotation data can define that a specific pixel represents a region of a candidate nucleus having a strong match for a given biomarker test. Of course, the annotation data can define arbitrary areas of the image data that meet the condition. Furthermore, the annotation data may be probabilistic rather than binary. In one option (suitable for display to a human operator), the annotation data is displayed on an output image as a coloured region, although this is not essential. The annotation data can be provided to define several conditions of the referenced coordinate in the input image data, and these conditions may be independent or mutually exclusive. An automatic machine learning algorithm can read a point coordinate of the annotation data defining a region of the cell meeting a particular biomarker condition, and reference the input image data of the image to which the annotation data refers. The automatic machine learning algorithm may then import a portion of the input image data defined as meeting the particular biomarker condition as an example of an input image meeting the particular biomarker condition. The automatic machine learning algorithm may then engage in a training operation referencing the input image data meeting the particular biomarker condition will stop in this way, annotation data may be used in combination with image data to provide more accurate training.

In the following application, the "first image data" and the "second image data" are a digital representation of an image of a biological sample, for example a histopathology sample, obtained using, for example, a digital bright-field microscope, a digital fluoroscopy microscope, and the like. Accordingly, the first and second image data can at least be acquired directly from a digital microscope, or may be downloaded from a PACS image storage system.

In the following application, the term "candidate object" may refer to areas of tissue in a pathology sample, an individual cell, a cell nucleus, a tubule, a cell of a particular type such as a lymphocyte, a erythrocyte, a monocyte, a dendritic cell, a microglial cell. The annotation approach discussed this application has wide application based upon the particular staining technique applied to the precursor tissue sample.

In the following application, the term "stain confidence data" reflects the probability that a stain is present at a particular pixel or arbitrary region of the second input image data. A stain confidence map is an image corresponding to the second image data showing the probability that a particular stain is present in the second image data.

In the following application, a "stain for indicating tissue structure" is, for example, a routine Haematoxylin and Eosin (H&E) stain, although other stains that enable discernment of tissue structure can be applied, for example Periodic Acid Schiff (for kidney or liver biopsy), Perls' Prussian Blue Iron (for liver staining), Gomori Trichome (for muscle and collagen structure), Alcian Blue (for atheroschlerosis detection). The skilled person will appreciate that many types of tissue structure revealing stains can be applied.

In the following application, a "stain for revealing the presence of biomarker" may refer, for example, to immunohistochemical chemical (IHC) markers. An example of such markers are CD3, CD20, CD30, CD3, RCC, keratins, vimetin). The skilled person will appreciate that many types of biomarker revealing stains can be applied.

The following application refers to a technique that can be applied in histochemical staining.

Accordingly, it is an idea of the invention to obtain image data of the same sample before and after at least one re-staining operation (firstly with a structure-revealing stain, and secondly with a biomarker revealing stain). Sections of the first and second image data having a good registration relationship are chosen, along with the probability of detecting a desired candidate object (such as nucleus) and the probability of the biomarker revealing stain being present annotation data suitable for training a machine learning algorithm on the first and/or the second image data is provided.

BRIEF DESCRIPTION OF THE DRAWINGS

Exemplary embodiments of the invention will be described in the following with reference to the following drawings:

FIG. 9 b) illustrates a line representation of the nucleus segmentation data of the experimentally obtained H&E tissue image to the same scale and origin as for FIG. 9 a).

FIG. 9 c) illustrates an illustrates an experimentally obtained IHC tissue image comprising CD3/20 stain.

FIG. 9 d) illustrates a line representation of the nucleus stain markers of the experimentally obtained IHC tissue image to the same scale and origin as for FIG. 9 c).

FIG. 11 b) illustrates annotation data in the form of a line overlay of the image of 11 a), at the same scale and origin as FIG. 11 a).

DETAILED DESCRIPTION OF EMBODIMENTS

Figure 1:
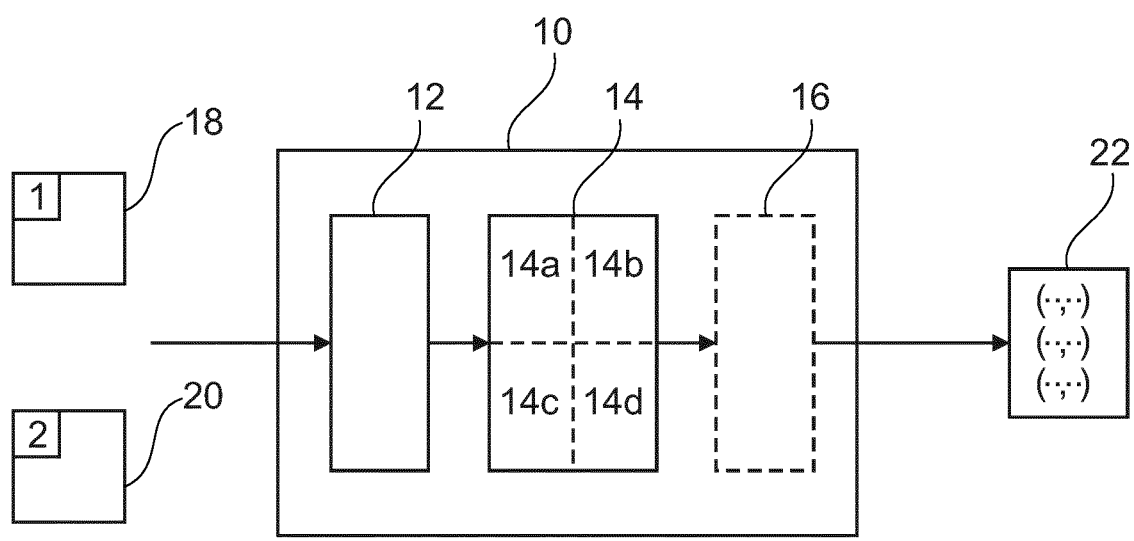
FIG. 1 schematically illustrates an apparatus in accordance with a first aspect.

Building a large set of annotation data for training and verifying image analysis algorithms used in computational pathology is an important task. For deep learning, the availability of a large annotated dataset is important for the success of such an algorithm stop in this case, the dataset may involve hundreds, or thousands of pathology slides. Applying a computational recognition process to such large image dataset might involve an excessive amount of computer time. In a case where individual cells in the dataset must be recognised and categorised (annotated), such a large dataset would be difficult to handle accurately using a human annotator.

Accordingly, it has been proposed to annotate large datasets using biomarker staining. In this approach, biomarkers are used that bind specifically to a cell or tissue type that need to be annotated. By analysing image data of such biomarker stained tissue, and annotation mask (annotation data) can be created efficiently by a computer processing approach. The annotation data may then be used as an input to training the algorithm on an H&E image, for example. However, this technique requires a near-perfect alignment between the images of the H&E image, and the biomarker stained image. If there is not a near-perfect alignment between the H&E image and the biomarker stained image, the annotation data would incorrectly train the deep-learning algorithm.

For the alignment of images it is important to maintain high tissue quality, and large numbers of tissue re-staining cycles are not advisable. Accordingly, there is a need to overcome this limitation.

It is proposed to use so-called re-staining, such that the same tissue slide may be used to enable the removal of the H&E stain and then the application of biomarker staining. According to this technique, a misalignment between the H&E-stained image and the biomarker stained image (for example) is minimised.

The use of a single re-staining step for providing annotation data (ground truth data) for deep-learning algorithm training proposes to use a biomarker which stains a class of objects that is a subset of an initial set of candidate objects. The likelihood map is generated to indicate the probability of the candidate objects belonging to the stained class (the class of interest). The likelihood map is based at least on registration quality (between a tissue structure image and a biomarker image), the probability of initial detection results (of the candidate objects in the tissue structure image) and the probability of the biomarker presence (in the biomarker image). The likelihood map may be generated based on an arbitrary portion size of the input images and may refer to the area of cells, nuclei, or arbitrarily placed tiles in the images, for example. Although it is noted above that a single re-staining step for providing annotation data is preferred, the present invention is not so limited and second, third, fourth, and subsequent re-staining steps may be provided, for example targeting different biomarkers, although there is a potential for subsequent re-staining steps to enjoy a lower registration quality.

Based on the generated likelihood map, both the positive and negative samples may be selected to compose a training set for a deep learning algorithm.

Accordingly, according to a first aspect, there is provided an apparatus 10 for automatically generating annotation data of tissue images.

FIG. 1 illustrates an apparatus 10 according to the first aspect. The apparatus comprises an input unit 12 and a processor 14.

The input unit 12 is configured to acquire first image data 18 comprising a representation of a tissue sample stained with a first stain for indicating tissue structure, and to acquire second image data 20 comprising a representation of the tissue sample stained with a second stain for revealing the presence of a biomarker in the tissue sample.

The processor 14 is configured to detect a plurality of candidate objects in the first image data 18, and a corresponding plurality of detection probabilities of the detected candidate objects, to generate stain confidence data of the second image data 20 representing a likelihood that a corresponding portion of the tissue sample comprises the biomarker targeted by the second stain, and to generate image annotation data 22 comprising a representation of the plurality of candidate objects, wherein the individual candidate objects of the plurality of candidate objects are annotated to indicate biomarker presence in corresponding portions of the second image data if an individual candidate object reaches a combined confidence based on the corresponding plurality of detection probabilities of the detected candidate objects, the corresponding stain confidence data, and a corresponding registration quality threshold between the first and second image data of the candidate objects.

Optionally, the apparatus 10 comprises an output unit 16.

An exemplary implementation of the apparatus 10 is using a personal computer (PC). In this example, the PC acquires first image data 18 and second image data 20 from a computer network (for example, the PACS system of a hospital), and as such the input unit 12 may be a network interface. The processor 14 is a combination of a general-purpose PC data processor 14a (such as an Intel i5™ processor), random access memory (RAM) 14b, and optional graphics processing unit (GPU) image processing accelerator, and a hard disk drive (14d). The processor 14 may be configured to load a program configured to implement the present invention from program instructions stored on the hard disk drive 14d loaded into the RAM 14b, and to execute the program in accordance with the program instructions. The data processor 14a may acquire the first image data 18 and the second image data 20 from the input unit 12, RAM 14b, and/or hard disk drive 14d, and generate annotation data which may be stored on the hard disk drive 14d, communicated via the output unit 16 (for example, to a GUI displayed on a monitor, over a network interface to an external PACS server, and the like). However, it will be appreciated by skilled person that this is only an example implementation, and the apparatus 10 may also be implemented as a large-scale computer cluster, optionally accelerated using a GPU array and/or an FPGA, and/or a specialised deep-learning processing array, for example.

Figure 2:
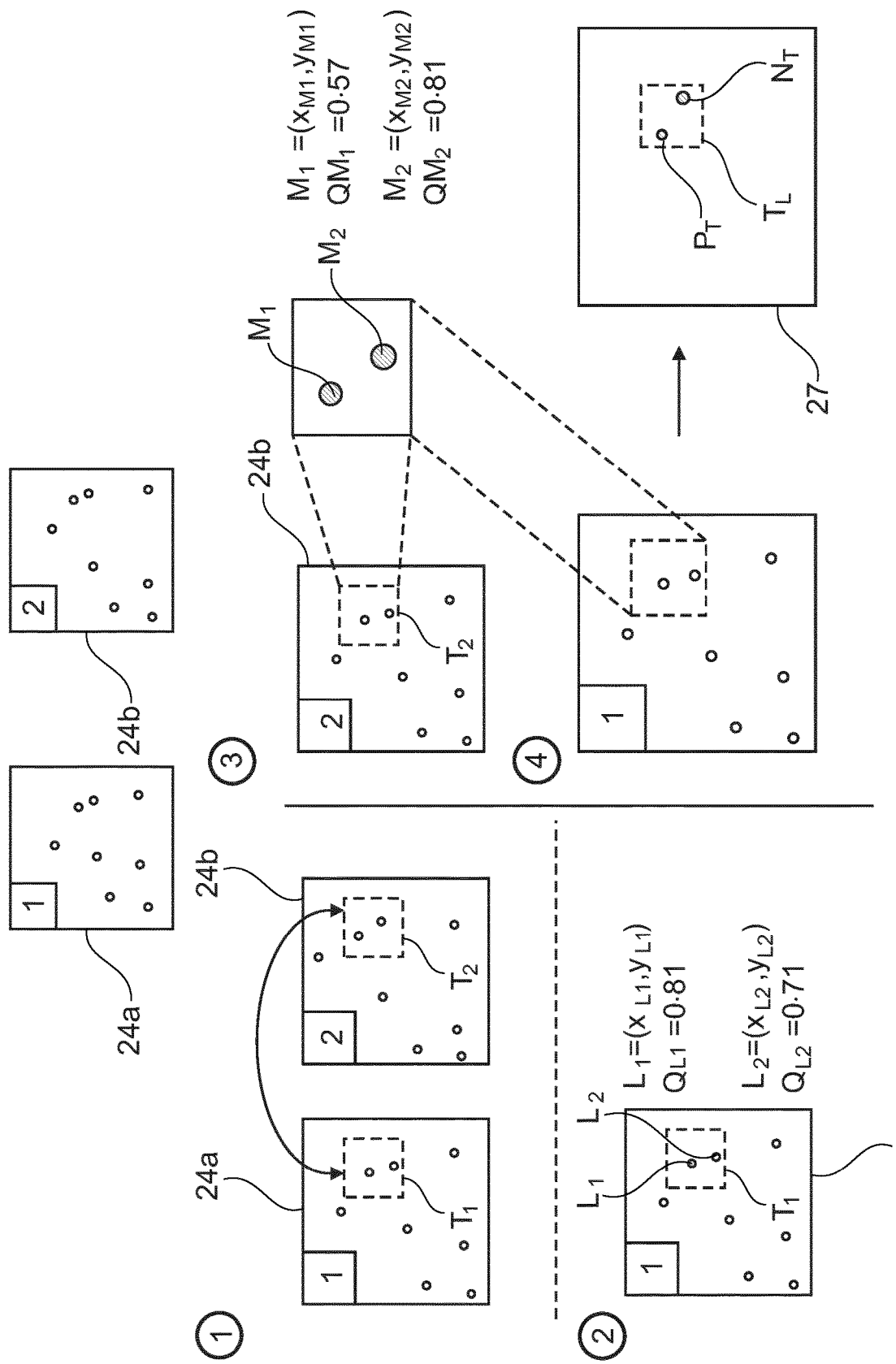
FIG. 2 schematically illustrates an application of the method according to the second aspect.

FIG. 2 schematically illustrates the data processing performed using the apparatus 10 for generating the annotation data.

First image data 24a comprising a representation of tissue structure of a tissue sample (usually by an H&E staining process) and second image data 24b comprising a representation of the same tissue sample stained with a stain for revealing the presence of a biomarker in the tissue sample is provided. The image data may be in a proprietary or open-source image format. For example, an image file associated with a 20× scan of a 20 mm×15 mm tissue specimen may be around 4 GB in size, optionally compressed with a format such as JPEG2000.

The present example is explained with an example of a detector that is trained to detect a broad class of lymphocytes based on an H&E-stained nucleus detector, comprising T-cell lymphocytes (stained with CD-3 marker), however it will be appreciated that many alternative combinations of stain may be used.

Step 1 of FIG. 2 illustrates the registration of the first image data (the H&E image, for example) with the second image data (the IHC image, for example). The images are registered using an automatic registration algorithm is known to a person skilled in the art. The images may be registered for mutually corresponding tiles, or between arbitrarily calculated portions of the first and second images (a feature-based registration), for example.

Figure 3:
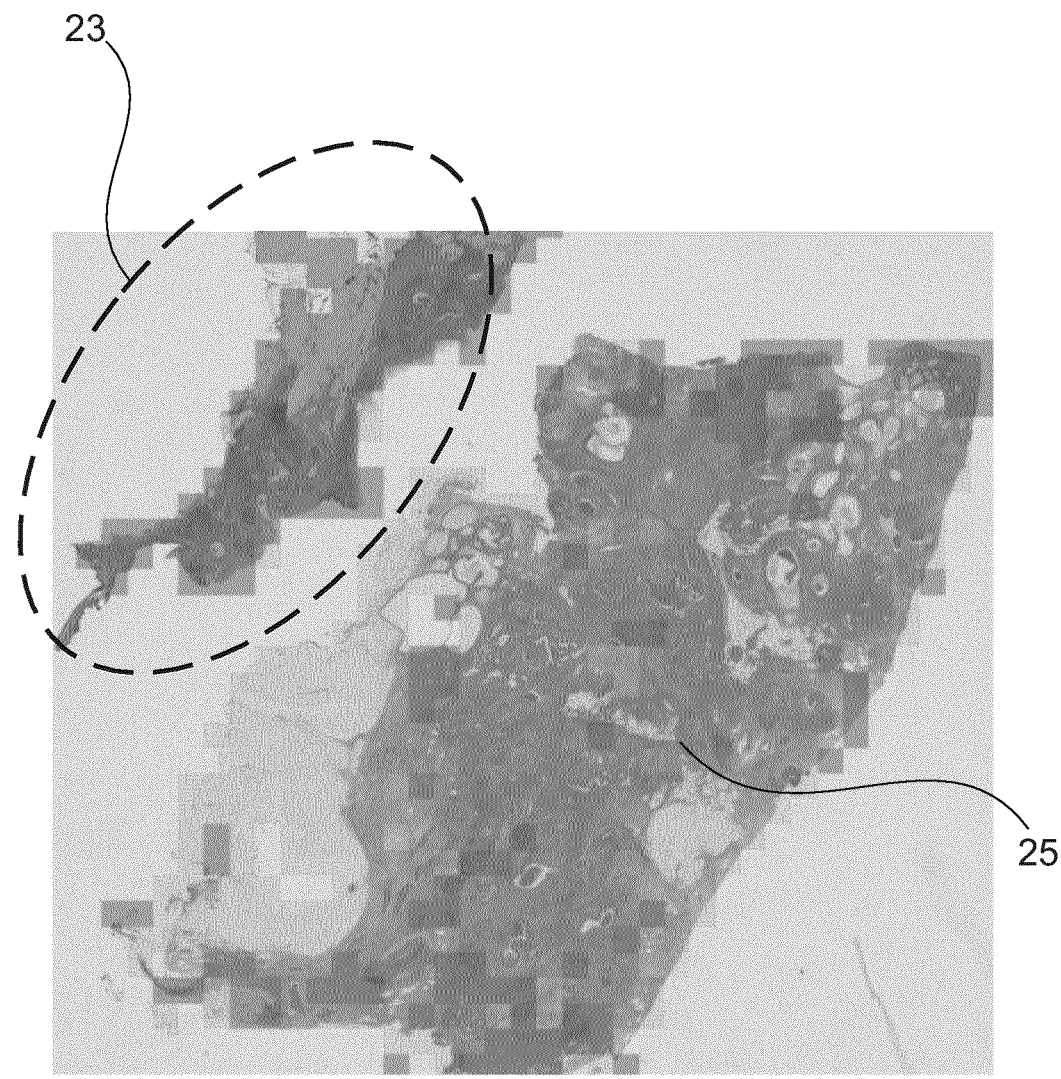
FIG. 3 illustrates an experimentally obtained example of a registration quality map overlaid on top of an original H&E image.

Turning briefly to FIG. 3, an experimentally obtained example of a registration quality map overlaid on top of an original H&E image is shown. Portion 23 is highlighted as an area having relatively low registration quality, whereas region 25 is illustrated as a region having relatively good registration quality. Accordingly, square tiles in portion 23 are excluded from the annotation data generating process. It will be appreciated that the generation of an image-based registration quality map is not essential, and at the many ways to store registration quality information of coordinates of image data.

Step 2 of FIG. 2 illustrates the provision of registration quality metrics $Q_{L1}$ and $Q_{L2}$ for coordinates $L_1$ and $L_2$ of registered tile $T_1$ (when compared to the second image data). In this case, the combined registration quality of pixels in the tile between the same portions of the first and second image data is reasonably good and tile pair $T_1$ and $T_2$ in the first and second image data, respectively, is selected of the tile pair that can be used in the subsequent data processing. By rejecting tiles that have a poor registration quality, the final annotation data set is more accurate, resulting in a more accurate training of an algorithm that uses the annotation data set. Additionally, performing the present invention on corresponding tiles of the first and second image data having a poor registration is a waste of computational effort.

Step 3 of FIG. 2 illustrates the generation of stain confidence data using the second image data. For example, the portion (tile) $T_2$ considered to be well-registered to the corresponding portion (tile) $T_1$ in the first image data is analysed to produce stain confidence data.

In the present example, the second image data may comprise an IHC image with CD markers. Accordingly, a stain confidence map is generated reflecting the probability of the presence of specific biomarkers markers in the portion $T_2$ of the IHC image. For example, the stain confidence map is a transformation of the colour deconvolved DAB channel image.

Figure 4:
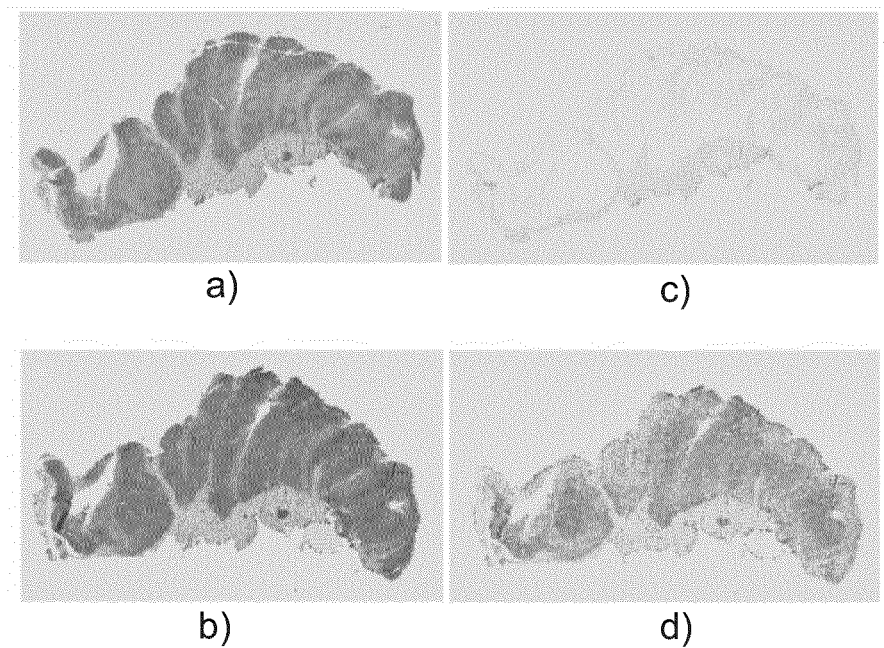
FIG. 4a) illustrates an experimentally obtained slide for a negative control.
FIG. 4b) illustrates an experimentally obtained slide for a positive control.
FIG. 4c) illustrates an experimentally obtained separated DAB channel for a negative control.
FIG. 4d) illustrates an experimentally obtained separated DAB channel for a positive control.

Turning briefly to FIG. 4, the stain confidence map is generated by mapping the stain values in the portion $T_2$ of the second image data corresponding to $T_1$ in the first image data to a confidence value. Optionally, the confidence value may be on scale between 0 and 1, although it will be appreciated that any numerical may be applied. For example, the DAB deconvolution is used to generate a slide for negative control (NC) shown in FIG. 4a), and a slide for positive control (PC) shown in FIG. 4b). As expected, the separated DAB channel for the negative control shown in FIG. 4c) is almost blank, and the separated DAB channel for the positive control shown in FIG. 4d) occurs over areas of the biomarker that express the presence of a condition that is being detected for. Accordingly, the pixel values of the positive control slide and the negative control slide are used to calibrate the mapping curve for generating a stain confidence map.

Figure 5:
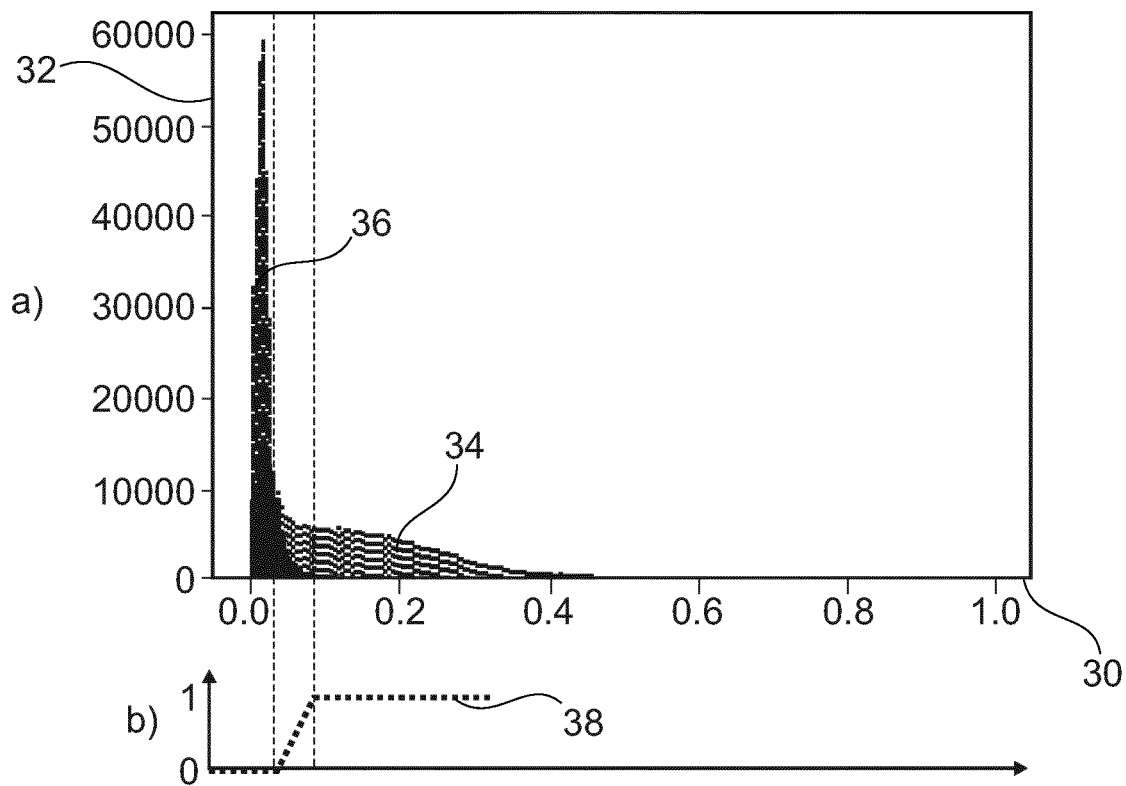
FIG. 5a) illustrates experimentally obtained histograms of DAB channel values following colour deconvolution.
FIG. 5b) illustrates an transformation curve defined using the experimentally obtained histograms of FIG. 5 a).

One example of such a calibration process is illustrated in FIG. 5a). A histogram of DAB channel values has three curves plotted. The x-axis of the histogram 30 represents the stain value bin of the DAB channel, and the y-axis 32 of the histogram represents the number of pixels in the portion (or tile) of the second image data present in the relevant stain value bin of the DAB channel.

A first histogram 34 represents a histogram of positive control values. A second histogram 36 represents histogram of negative control values. FIG. 5b) illustrates the stain confidence map having a transformation curve 38 indexed to the pixel bin axis 30 of the histogram. The transformation curve 38 is generated to match the stain values of the deconvolved channels of the second image data to a stain confidence value between 0 and 1. Of course, this is one example for generating a transformation curve to distinguish between positive control values and negative control values for processing second image data. Optionally, the transformation curve 38 may comprise a transition region in which the pixels are not categorised as either positive or negative control values. This has the effect of reducing noise caused by pixel values near a transition boundary between the positive and negative control value.

Figure 6:
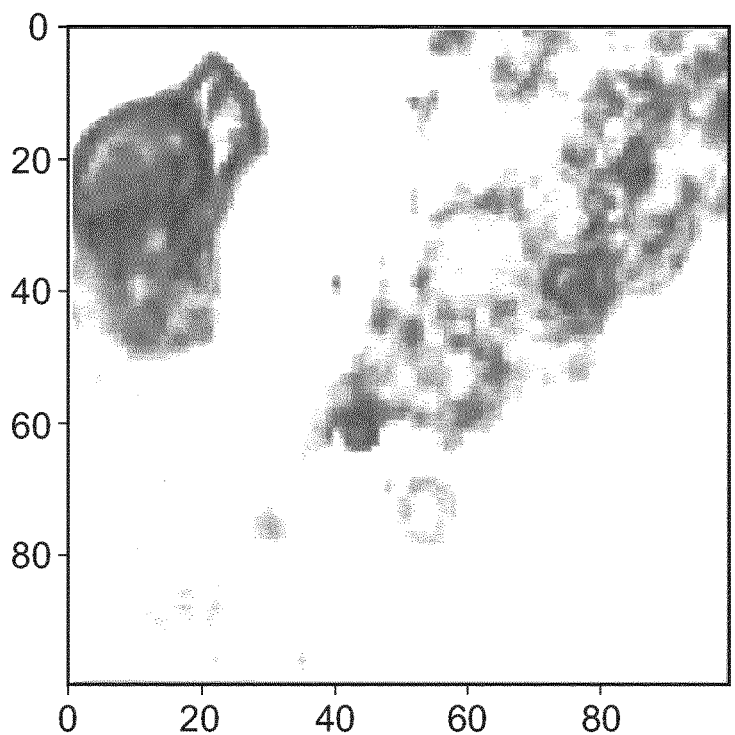
FIG. 6 illustrates an experimentally obtained DAB channel of a region of interest of a biomarker stained image.
Figure 7:
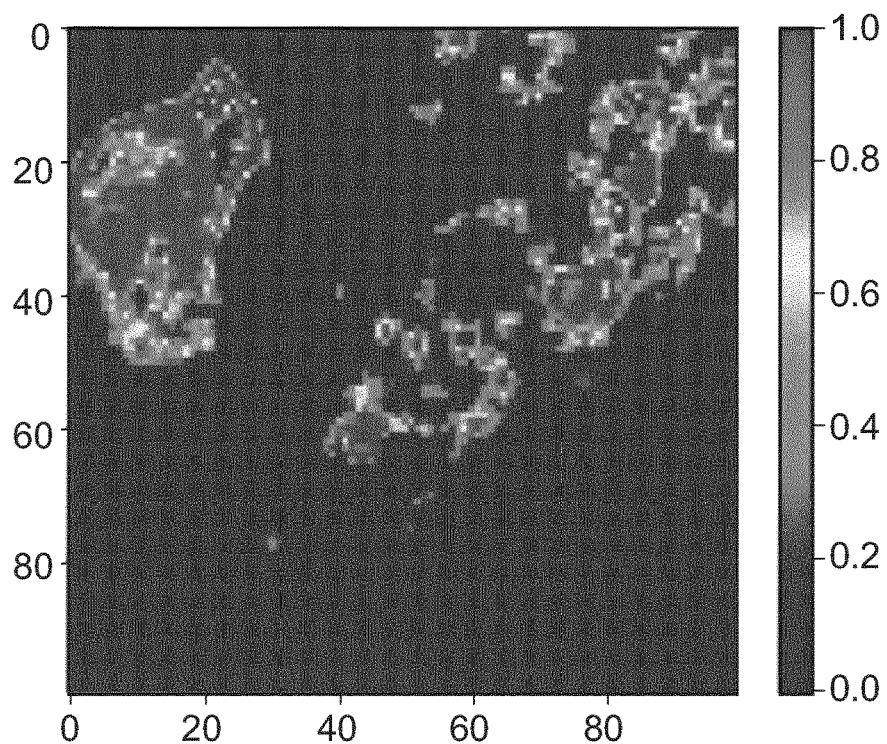
FIG. 7 illustrates generated stain confidence values corresponding to the DAB channel of the biomarker stained image.

FIG. 6 illustrates experimentally obtained DAB channel data of a region of interest of a biomarker stained image. FIG. 7 illustrates the DAB channel data of FIG. 6 after its pixel values have been mapped to the stain confidence function of FIG. 5b). Accordingly, FIG. 7 provides a "heat map" of areas having a low probability of representing a stained portion of the second image data, and areas having a high probability of representing a stained portion of the second image data.

Figure 8:
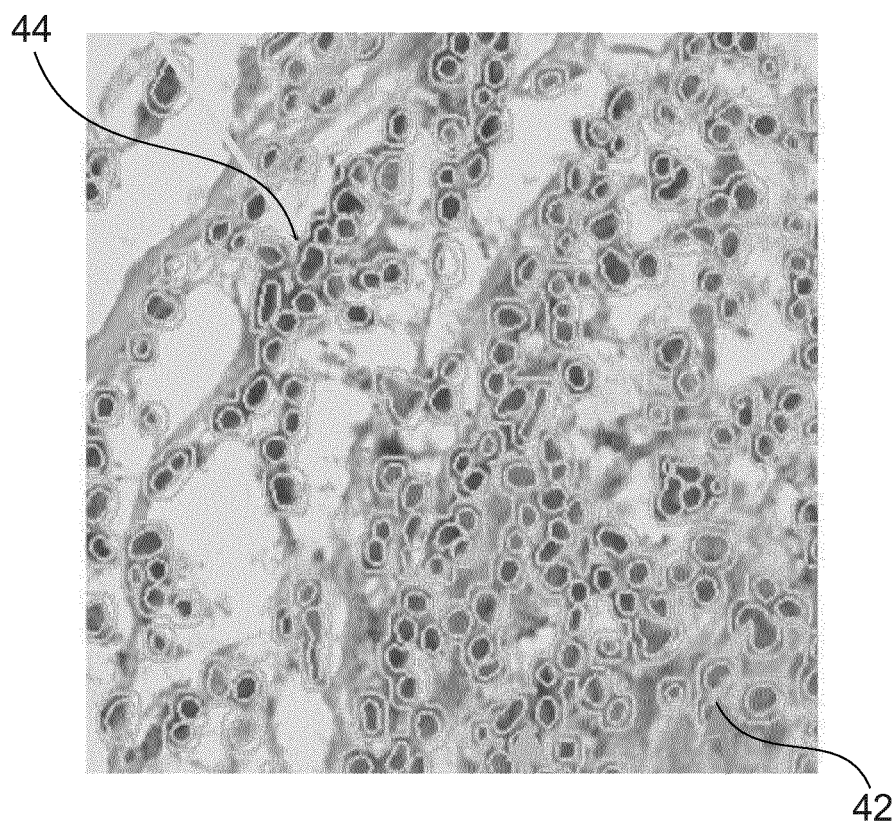
FIG. 8 illustrates an experimentally obtained stain confidence map comprising markers within and around the cell nucleus border obtained according to the approach of the present application.

FIG. 8 illustrates an experimentally obtained an IHC image comprising stain confidence markers within and around the cell nucleus border obtained according to the approach of the present application.

Figure 9:
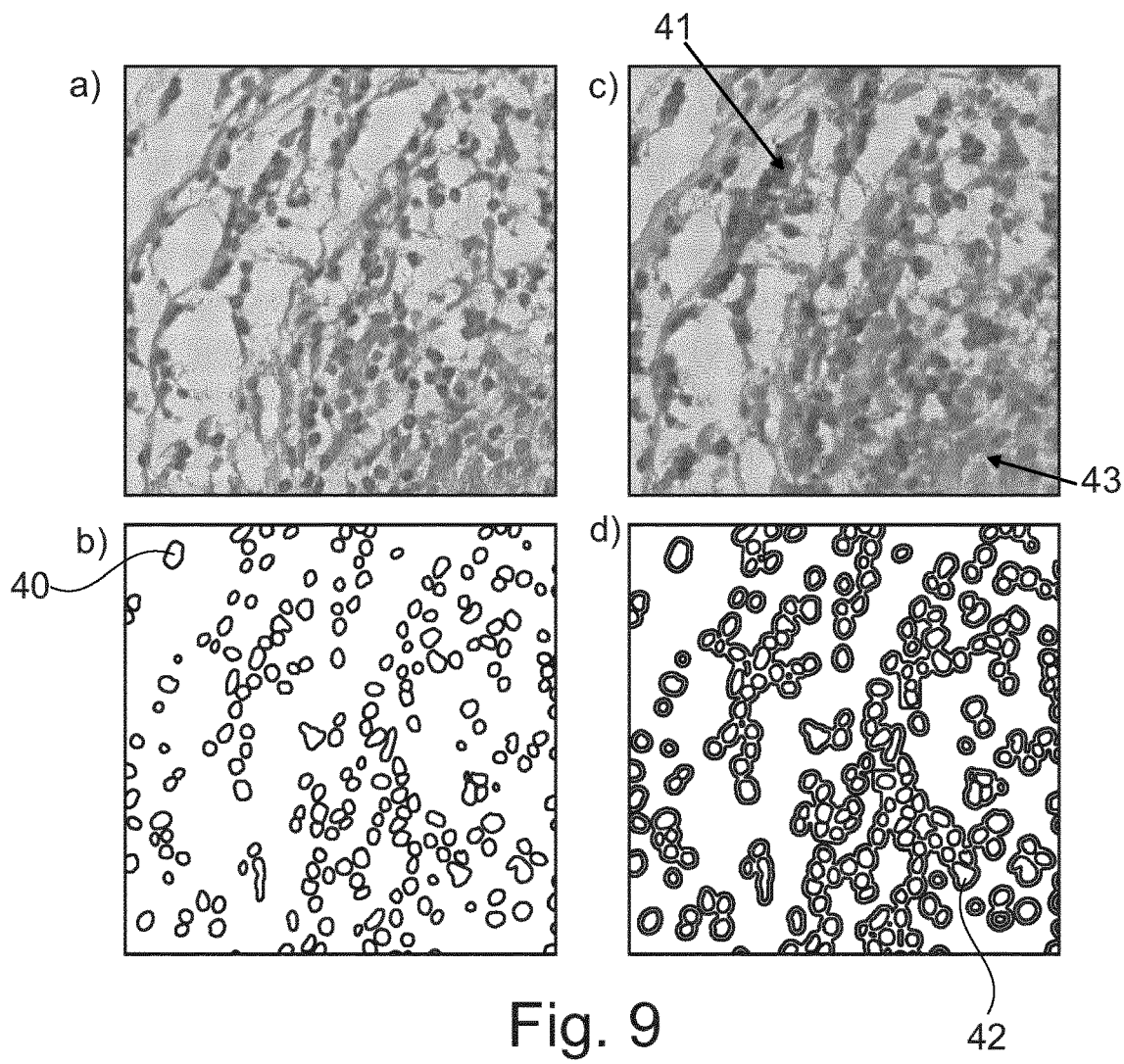
FIG. 9 a) illustrates an experimentally obtained H&E tissue image.

FIG. 9 a) illustrates an experimentally obtained H&E tissue image.

FIG. 9 b) illustrates a line representation of the nucleus segmentation data of the experimentally obtained H&E tissue image to the same scale and origin as for FIG. 9 a).

FIG. 9 c) illustrates an illustrates an experimentally obtained IHC tissue image comprising CD3/20 stain.

FIG. 9 d) illustrates a line representation of the nucleus stain markers of the experimentally obtained IHC tissue image to the same scale and origin as for FIG. 9 c).

The nucleus segmentation from, a corresponding H&E image (first image data) is transferred to corresponding locations in the IHC image (second image data) of FIG. 8. It is possible to discern in FIG. 8 a location 42 having a relatively weak staining (indicating the location of a negative sample) and a location having a nucleus with a relatively strong staining 44 indicating a positive sample. Optionally, as indicated in FIG. 8, the location of markers is checked within, and around, the cell nucleus border.

Referring again to FIG. 2, step 2, a plurality of candidate objects is detected in the first image data. Optionally, a nucleus detector is used to detect a plurality of candidate objects in the first image data. For example, nuclei may be segmented using a multi-reference level set (MRL) algorithm, a random forest algorithm, or a graph-cut algorithm, or any other machine-learning based training algorithms, for example. A skilled person will be able to apply other forms of nucleus detector algorithms. In the present example, a nucleus detector is applied to tile $T_1$. The corresponding nucleus segmentation coordinates are transferred to tile $T_2$ of the second image data, based upon the registration results computed in step 1 of FIG. 2. This provides a correspondence between a nucleus detected in the tissue structure image (first image data), and the tissue biomarker image (second image data).

In this example, the stain confidence values within and around each detected cell nucleus in the first image data is summed. Combined with the nucleus detection confidence value (an example of a detection probability of a detected candidate object in the first image data), it is possible to define a likelihood score value for a candidate nucleus to be positive for the biomarker targeted in the second image data (in this case, CD3/20 positive).

$$P_{CD} = \left( \frac{\int \text{nucleus } P_{stain}}{Area_{Nucleus}} + P_{nucleus} \right) / 2 \quad (1)$$

Equation (1) defines the integral of the stain likelihood values over the nucleus area, divided by the total area of nucleus. This integral is added by the nucleus likelihood value. The sum is then divided by two to obtain an averaged (integrated) value for the total likelihood of the nucleus to be the marker-positive.

In the above, the term "nucleus" means the region within and around each nucleus contour. It will be appreciated that the expression above is one figure of merit for determining the likelihood score for an individual candidate nucleus to be positive for a given biomarker. However many expressions may be derived. In a variation, only the nucleus staining itself may be taken into account. In the case where the candidate object of interest is not a nucleus or area of nucleus, a different segmentation approach may be required. For example, detecting fibrous structures in lung tissue may require a different segmentation algorithm.

Turning back to FIG. 2, step four concerns a selection of candidate objects based on the corresponding stain confidence data. In the present example, the corresponding stain confidence data is a nucleus level likelihood score, although the different staining protocols different corresponding stain confidence data would be applied.

To select positive and negative samples foreground-truth training of a detector, selection is made of candidate objects (nuclei) having a sufficiently high corresponding stain confidence ($P_{CD}$). For example, the corresponding stain confidence of a candidate object may be higher than a pre-defined threshold. A plurality of candidate objects of interest in tile of the first image data $T_1$ having a stain confidence data higher than a first threshold may optionally be labelled as, for example, positive samples. This is an example of a first annotation data type. Optionally, candidate objects in the tile of the first image data $T_1$ having a low corresponding stain confidence (smaller than a second stain correspondence threshold) are labelled as, for example, negative samples. This is an example of a second annotation data type. Optionally, candidate objects in the tile of the first image data $T_1$ having an indeterminate corresponding stain confidence may be labelled as, for example, indeterminate samples. This is an example of a third annotation data type. Accordingly, the annotation data may be comprised of a plurality of different types of annotation, each having a different biological significance.

Accordingly, the generated annotation data comprising one or more of the first, second, and third annotation data types has been generated. It will be appreciated that the annotation data does not need to be provided as an image, but may be provided as a data structure having a list of image coordinates, and the relevant annotation at a specific order. Optionally, the annotation data may define the annotation type of a portion of an image. In other words, the annotation data may be interpreted with reference to a corresponding image and overlaid on top of the corresponding image (and the first, or the second image data, for example) to enable the display of the annotations to a human viewer. In practice, the generated annotation data is supplied to a machine-learning algorithm in combination with the first and/or second image data that has been used to generate the annotation data to enable the machine-learning algorithm to use the first and/or second image data to improve its model.

Figure 10:
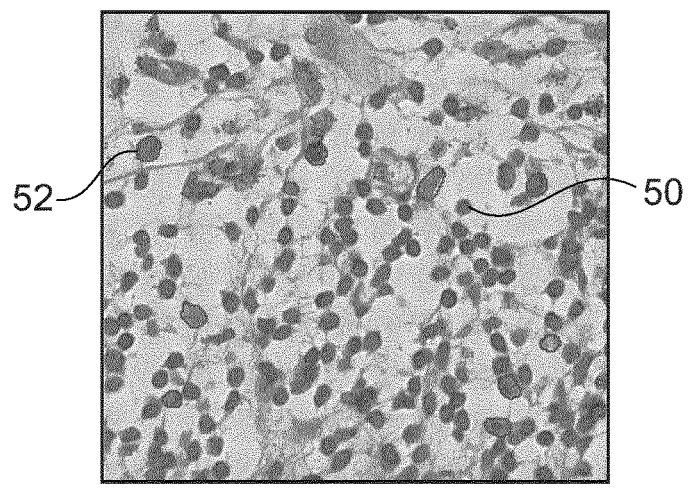
FIG. 10 illustrates a pathology image comprising an overlay of annotation data generated according to an example technique discussed in the application.

FIG. 10 illustrates an experimentally obtained example of an IHC stained image with the stain confidence map used to annotate regions of the image having a greater stain confidence than a certain threshold. For example, the region 50 indicates a weakly stained region in the IHC image (second image data), that accordingly has not been marked in the stain confidence map. Region 52 is more strongly stained, and has been marked in the stain confidence map.

Figure 11:
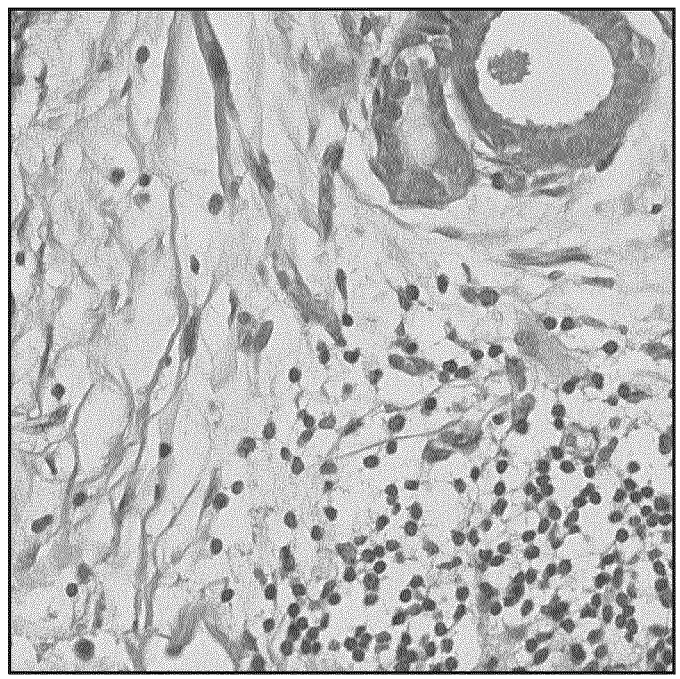
FIG. 11 a) illustrates another experimentally obtained IHC stained pathology image.
Figure 11:
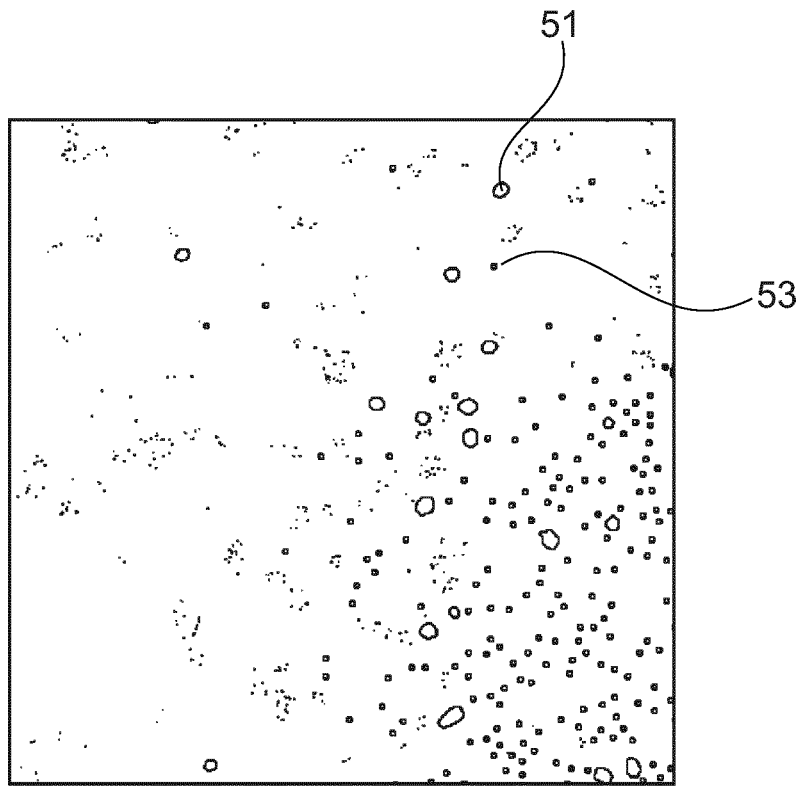

FIG. 11 *a*) illustrates another experimentally obtained IHC stained pathology image.

FIG. 11 *b*) illustrates annotation data in the form of a line overlay of the image of 11 *a*), at the same scale and origin as FIG. 11 *a*). The annotation data comprises large boxes 53 to represent positive samples, and smaller dots to represent negative samples, for example. The regions denoted with a contour 51 are optionally labelled as "unknown", for example.

Accordingly, before processing flow may be fully automated, for instance into a batch processing mode. A user of the system only has to select a batch of slide image pairs (H&E and IHC, for example) and the system will automatically CD-marker verified ground-truth locations of lymphocytes.

The apparatus 10 optionally comprises an output unit 16. The output unit 16 is capable of outputting the generated annotation data. One output data format, for example, is a data structure comprising a list of pixel locations of annotated pixels. A more complex data format comprises a hierarchical data structure comprising a list of pixel locations, and whether the pixel location has been annotated with a specific annotation type, for example. Optionally, the output unit 16 is configured to interpret the output data structure and to generate overlays of the pixel annotations onto the first and/or second image data. Accordingly, the output unit 16 may comprise a output display such as a monitor, and the output unit 16 may generate display signals to display an annotated output image to the user. Accordingly or in combination, the output unit 16 may be configured to transfer the generated annotation data, optionally with the first and/or second image data, to a PACS server or archive for future use and training of a machine-learning algorithm.

According to a second aspect, there is provided a computer-implemented medical image annotation method for automatically generating annotation data of tissue images comprising:

a) acquiring 70 first image data comprising a representation of a tissue sample stained with a first stain for indicating tissue structure;
b) acquiring 72 second image data comprising a representation of the tissue sample stained with a second stain for revealing the presence of a biomarker in the tissue sample;
c) detecting 74 a plurality of candidate objects in the first image data, and a corresponding plurality of detection probabilities of the detected candidate objects;
d) generating 78 stain confidence data of the second image data representing a likelihood that a corresponding portion of the tissue sample comprises the biomarker targeted by the second stain; and
e) generating 80 image annotation data comprising a representation of the plurality of candidate objects, wherein the individual candidate objects of the plurality of candidate objects are annotated to indicate biomarker presence in corresponding portions of the second image data if an individual candidate object reaches a combined confidence based on the corresponding plurality of detection probabilities of the detected candidate objects, the corresponding stain confidence data, and a corresponding registration quality threshold between the first and second image data of the candidate objects.

Optionally, the first stain is a Haematoxylin and Eosin (H&E) stain, and the second stain is a immunohistochemistry (IHC) stain.

Figure 12:
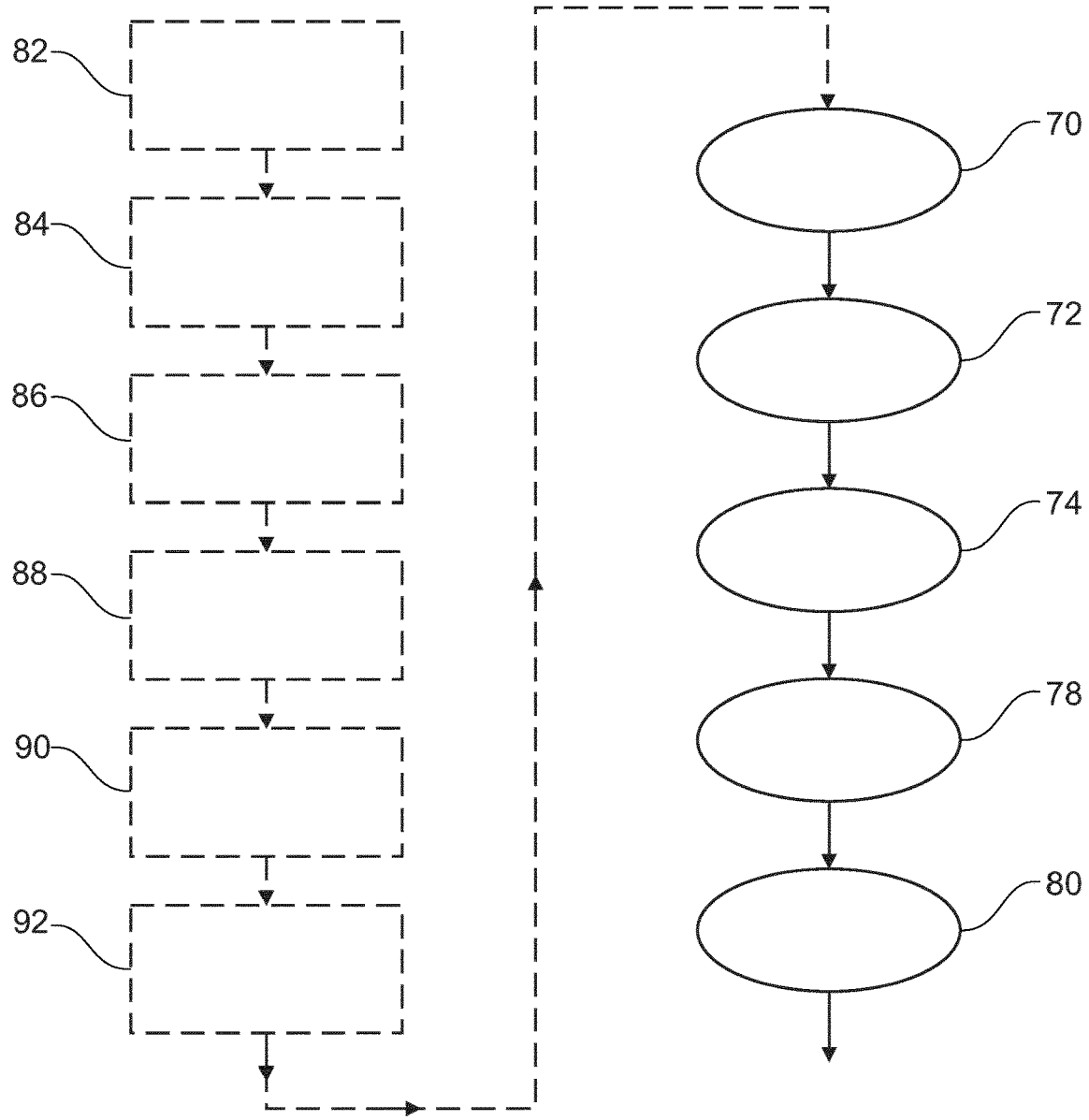
FIG. 12 schematically illustrates a method according to the fourth aspect.

FIG. 12 illustrates the method according to the second aspect.

According to a third aspect, there is provided a method for generating annotation data of tissue images comprising:
a1) acquiring 82 a tissue sample of a patient;
a2) performing 84 a first staining protocol on the tissue sample using a first stain;
a3) acquiring 86 first image data of the tissue sample using a digital microscopy imager;
a4) performing 88 a washing protocol of the tissue sample to substantially remove the first stain;
a5) performing 90 a second staining protocol on the tissue sample using a second stain; and
a6) acquiring 92 second image data of the tissue sample using the digital microscopy imager; and
performing the computer-implemented medical image annotation method for automatically generating annotation data of tissue images according to the second aspect.

The method according to the third aspect defines precursor steps that a laboratory professional would undertake. For example, a tissue biopsy will be obtained from a patient and prepared for histopathological analysis. The tissue sample is stained with a first stain capable of revealing tissue structure (such as H&E). The tissue slide is image to generate first image data. Subsequently, the tissue sample is processed by removing its cover slip, washing out the H&E stain, preprocessing the slide and immunostaining it with an IHC stain (such as a CD marker) for the intended biomarker and cover-slipping the sample. Accordingly, second image data comprising a representation of the tissue sample stained with the second stain for revealing the presence of biomarker in the tissue sample is obtained. Accordingly, the first and second image data obtained according to this method may be input to the computer-intimated method according to the second aspect. It will be appreciated that the method according to the second aspect is not limited to performing to stains, and in certain situations three, four, or more staining protocols may be obtained in addition to the tissue sample stained with the first stain capable revealing tissue structure.

According to an aspect, there is provided a computer-amended method for training a machine learning model comprising:
f1) acquiring image annotation data generated according to the computer-implemented method according to the second aspect;
f2) training a machine learning model using the image annotation data; and
f3) outputting the trained machine learning model.

Figure 13:
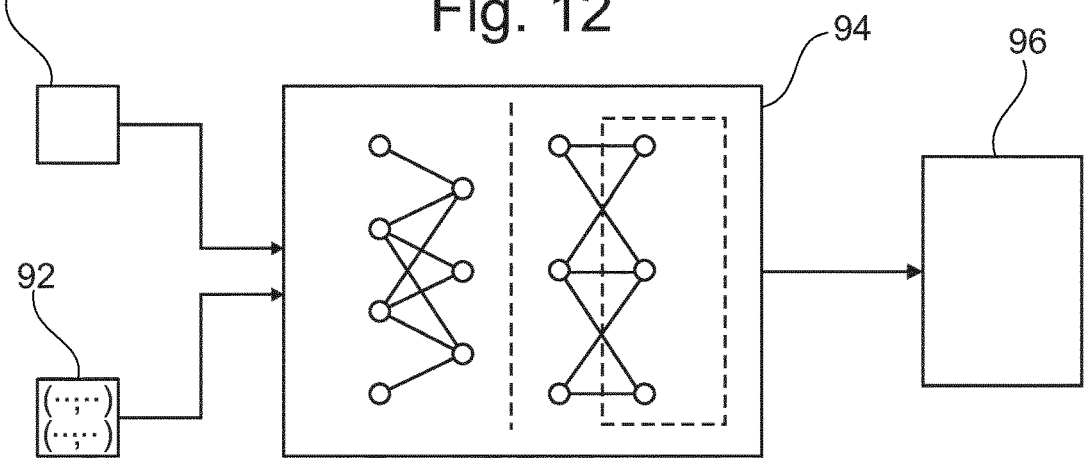
FIG. 13 schematically illustrates an apparatus for training a data model using annotation data obtained according to techniques described herein, to generate a computer data structure comprising image annotation data according to the seventh aspect.

Accordingly, FIG. 13 illustrates an aspect of an apparatus for training a machine learning model. The machine learning model acquires image data 90 of, for example, H&E image and/or IHC stained image, and corresponding annotation data 92 generated according to the computer-implemented method according to the second aspect. A machine-learning engine is configured to identify structure in the relationship between pixels of the corresponding annotation data 92 and the corresponding image data 90, and to update the configuration of its layers according to the type of machine learning algorithms deployed. For example, the machine learning model 94 may comprise an auto encoder algorithm, a sparse auto encoder algorithm, variational auto encoder algorithm, demonising auto encoder algorithm, a deep belief network, convolution or neural network, a deconvolution network, or a deconvolution or inverse graphics network. The machine learning model 94 is configured to output a trained machine learning model 96, which is capable of identifying candidate objects in input image data that is similar to the input image data from images upon which the annotation data has been provided.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be aligned providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain features are re-cited in mutually different dependent claims does not indicate that a combination of these features cannot be used to advantage. Any reference signs in the claims should not be construed as limiting the scope.

The invention claimed is:

1. An apparatus for automatically generating annotation data of tissue images comprising:
   a processor
   a memory storing instructions, wherein the instructions when executed by the processor cause the processor to:
      receive first image data comprising a representation of a tissue sample stained with a first stain for indicating tissue structure, and
      receive second image data comprising a representation of the tissue sample stained with a second stain for revealing the presence of a biomarker in the tissue sample; and
      detect a plurality of candidate objects in the first image data; and obtain a corresponding plurality of detection probabilities of the detected candidate objects,
      generate stain confidence data of the second image data representing a likelihood that a corresponding portion of the tissue sample comprises the biomarker targeted by the second stain, and to generate image annotation data comprising a representation of the plurality of candidate objects, wherein the individual candidate objects of the plurality of candidate objects are annotated to indicate biomarker presence in corresponding portions of the second image data if an individual candidate object reaches a combined confidence based on the corresponding plurality of detection probabilities of the detected candidate objects, the corresponding stain confidence data, and a corresponding registration quality threshold of a registration between the first and second image data of the candidate objects;
      segment the plurality of candidate objects in the first image data,
      transfer the segmentation of the plurality of candidate objects in the first image data to the second image data based on the registration between the first and second image data, and
      sum the corresponding stain confidence data in the location of the plurality of candidate objects in the second image data, wherein the summed stain confidence data is useable with the plurality of detection probabilities of the detected candidate objects to determine a likelihood score value for candidate objects to be positive for the biomarker targeted by the second stain; and
      generate a registration quality map between the first image data and the second image data, wherein the processor is configured to only annotate candidate objects of the plurality of candidate objects to indicate biomarker presence when the registration quality map indicates that the registration between corresponding locations of the candidate object in the first and second image data surpasses a registration quality threshold.

2. The apparatus of claim 1, wherein the processor is further caused to generate the stain confidence data by generating a histogram of stain confidence using the second image data, and providing a plurality of stain confidence results corresponding to locations of the plurality of candidate objects in the first image data as the corresponding stain confidence data.

3. The apparatus of claim 1, wherein the processor is further caused to generate the image annotation data of the individual candidate objects of the plurality of candidate objects comprising a positive annotation of a first candidate object and a negative annotation of a second candidate object in the plurality of candidate objects.

4. The apparatus according to claim 1, wherein the processor is further caused to:
   generate the stain confidence data by generating a first channel of the second image data to function as a positive control, generating a second channel of the second image data to function as a negative control, and
   generate a histogram of stain confidence comprising generating a first histogram channel using the first channel of the second image data, to generate a second histogram channel using the second channel of the second image data, and to generate the histogram of stain confidence using the first and second histogram channels.

5. The apparatus according to claim 1, wherein the processor is further caused to detect a plurality of candidate objects in the first image data using a nucleus detector, and the corresponding plurality of detection probabilities of the detected candidate objects.

6. The apparatus of claim 1, further comprising:
   a graphical user interface to display the image annotation data, optionally in combination with the first and/or second image data.

7. The apparatus of claim 6, further comprising: a display configured to display the graphical user interface.

8. A computer-implemented medical image annotation method for automatically generating annotation data of tissue images comprising:
receiving first image data comprising a representation of a tissue sample stained with a first stain for indicating tissue structure;
receiving second image data comprising a representation of the tissue sample stained with a second stain for revealing the presence of a biomarker in the tissue sample;
detecting a plurality of candidate objects in the first image data, and a corresponding plurality of detection probabilities of the detected candidate objects;
generating stain confidence data of the second image data representing a likelihood that a corresponding portion of the tissue sample comprises the biomarker targeted by the second stain, comprising segmenting the plurality of candidate objects in the first image data, transferring the segmentation of the plurality of candidate objects in the first image data to the second image data based on the registration between the first and second image data, and summing the corresponding stain confidence data in the location of the plurality of candidate objects in the second image data, wherein the summed stain confidence data is used with the plurality of detection probabilities of the detected candidate objects to determine a likelihood score value for candidate objects to be positive for the biomarker targeted by the second stain; and
generating image annotation data comprising a representation of the plurality of candidate objects, wherein the individual candidate objects of the plurality of candidate objects are annotated to indicate biomarker presence in corresponding portions of the second image data if an individual candidate object reaches a combined confidence based on the corresponding plurality of detection probabilities of the detected candidate objects, the corresponding stain confidence data, and a corresponding registration quality threshold of a registration between the first and second image data of the candidate objects, and wherein generating the image annotation data comprises generating a registration quality map between the first image data and the second image data, and only annotating candidate objects of the plurality of candidate objects to indicate biomarker presence when the registration quality map indicates that the registration between corresponding locations of the candidate object in the first and second image data surpasses a registration quality threshold.

9. A method for generating annotation data of tissue images comprising:
acquiring a tissue sample of a patient;
performing a first staining protocol on the tissue sample using a first stain for indicating tissue structure;
acquiring first image data of the tissue sample using a digital microscopy imager;
performing a washing protocol of the tissue sample to substantially remove the first stain;
performing a second staining protocol on the tissue sample using a second stain for revealing the presence of a biomarker in the tissue sample; and
acquiring second image data of the tissue sample using the digital microscopy imager; and
performing the computer-implemented medical image annotation method for automatically generating annotation data of tissue images according to claim 8.

10. A non-transitory computer readable medium having stored thereon a computer program that when being executed by a processor causes the processor to perform the computer-implemented method of claim 8.

11. The non-transitory computer readable medium of claim 10, wherein the first stain is a haematoxylin and eosin (H&E) stain, and the second stain is an immunohistochemistry (IHC) stain.

12. The computer-implemented medical image annotation method of claim 8, further comprising:
a) acquiring the first image data; and
b) acquiring the second image data.

13. A method for generating annotation data of tissue images comprising:
segmenting a plurality of candidate objects in first image data, wherein the first image data comprises a representation of a tissue sample stained with a first stain for indicating tissue structure;
transferring the segmentation to second image data based on a registration between the first and second image data, wherein the second image data comprises a representation of the tissue sample stained with a second stain for revealing the presence of a biomarker in the tissue sample;
summing corresponding stain confidence data in the location of the plurality of candidate objects in the second image data, wherein the summed stain confidence data is useable with a plurality of detection probabilities of detected candidate objects to determine a likelihood score value for candidate objects to be positive for the biomarker targeted by the second stain; and
generating a registration quality map between the first image data and the second image data, wherein candidate objects of the plurality of candidate objects are annotated to indicate biomarker presence depending on whether the registration quality map indicates that the registration between corresponding locations of the candidate object in the first and second image data surpasses a registration quality threshold.

14. The method of claim 13, further comprising:
detecting a plurality of candidate objects in the first image data, and
obtaining a corresponding plurality of detection probabilities of the detected candidate objects.

15. A method for training a machine learning model comprising:
receiving image annotation data generated according to the method recited in claim 13;
training a machine learning model using the image annotation data; and
outputting the trained machine learning model.

16. A method comprising applying a machine learning model outputted according to claim 15.

17. A non-transitory computer readable medium having stored thereon a computer program that when being executed by a processor causes the processor to perform the computer-implemented method of claim 13.

18. The computer-implemented method of claim 13, wherein the first stain is a haematoxylin and eosin (H&E) stain, and the second stain is a immunohistochemistry (IHC) stain.

19. A method for training a machine learning model comprising:
    acquiring image annotation data generated according to the computer-implemented method recited in claim 13;
    training a machine learning model using the image annotation data; and
    outputting the trained machine learning model.

* * * * *